United States Patent [19]

Harvie

[11] Patent Number: 5,418,308
[45] Date of Patent: May 23, 1995

[54] RANDOM COPOLYMERS OF PROPYLENE AND NON-CONJUGATED DIENE OR TRIENE

[75] Inventor: James L. Harvie, Middlesbrough, England

[73] Assignee: BASF Aktiengesellschaft, Ludwigshafen, Germany

[21] Appl. No.: 949,877

[22] PCT Filed: May 15, 1991

[86] PCT No.: PCT/GB91/00762

§ 371 Date: Jan. 15, 1993

§ 102(e) Date: Jan. 15, 1993

[87] PCT Pub. No.: WO91/18030

PCT Pub. Date: Nov. 28, 1991

[30] Foreign Application Priority Data

May 15, 1990 [GB] United Kingdom ............ 9010887

[51] Int. Cl.⁶ .................... C08F 236/20; C08F 210/06
[52] U.S. Cl. ......................... 526/336; 526/335; 526/339; 526/901; 526/902; 526/904; 524/576; 524/579
[58] Field of Search ............... 526/336, 339, 901, 902, 526/335; 524/576, 579

[56] References Cited

U.S. PATENT DOCUMENTS

| | | | |
|---|---|---|---|
| 3,351,621 | 11/1967 | Bacskai | 526/336 X |
| 3,481,909 | 12/1969 | Di Pietro | 526/336 X |
| 4,366,296 | 12/1982 | Kitagawa et al. | 526/336 X |
| 4,680,318 | 7/1987 | Fujii et al. | 521/95 |
| 4,868,264 | 9/1989 | Evens et al. | 526/336 X |
| 5,262,503 | 11/1993 | Gotoh | 526/336 |

FOREIGN PATENT DOCUMENTS

| | | |
|---|---|---|
| 0311299 | 4/1989 | European Pat. Off. |
| 1295575 | 5/1962 | France. |
| 2145611 | 6/1990 | Japan. |
| 914884 | 1/1963 | United Kingdom. |
| 2053245 | 2/1981 | United Kingdom. |

OTHER PUBLICATIONS

Patent Abstract of Japan, vol. 14, No. 220, May 1990.

*Primary Examiner*—Fred Teskin
*Attorney, Agent, or Firm*—Cushman Darby & Cushman

[57] ABSTRACT

Copolymers of propylene and a non-conjugated diene or triene of the formula (I): $CH_2=CH(CHR^4)_nCR^1=CR^2R^3$, where $R^1$ and $R^2$ are hydrogen or alkyl, but are not both hydrogen; $R^3$ is alkyl or alkenyl of the formula (II): $-(CHR^8)_mCR^5=CR^6R^7$, where $R^5$ and $R^6$ are as defined for $R^1$ (above), but are not both hydrogen; $R^7$ is alkyl; each $R^8$ is as defined for $R^4$ (below); and m is 1 to 5; $R^4$ is hydrogen or alkyl especially methyl; and n is from 2 to 5, can be made using highly stereospecific Ziegler-Natta polymerisation catalysts. The copolymers have 99.9 to 60, particularly 99.5 to 85, mole % propylene residues and 0.1 to 40, particularly 0.5 to 15, mole % diene residues. The copolymers have unexpectedly low solubility in organic solvents such as xylene and can be cross-linked, vulcanised or cured to give polymers having improved high temperature performance.

7 Claims, No Drawings

RANDOM COPOLYMERS OF PROPYLENE AND NON-CONJUGATED DIENE OR TRIENE

This invention relates to copolymers of alpha-olefins and in particular propylene with non-conjugated diene or triene monomers.

Ethylene-propylene-diene monomer copolymers (EPDM rubbers) are a well known class of elastomeric copolymers. They are used in blends with thermoplastic polymers to increase the toughness of the thermoplastic. Additionally, the EPDM rubbers are unsaturated (one of the double bonds in the diene monomer is present in the polymer) and this enables ready cross-linking (vulcanisation). Unfortunately, the typical diolefins used poison highly stereospecific Ziegler-Natta olefin polymerisation catalysts and, thus, EPDM rubbers are made using non-stereospecific catalysts, typical of those used to homopolymerise ethylene.

The present invention is directed to providing a copolymer of propylene and optionally ethylene with a specific class of non-conjugated diene or triene monomers. The copolymers have high stereoregularity and are generally mainly thermoplastic rather than elastomeric as with EPDM rubbers.

The present invention accordingly provides a random copolymer of: from 0.1 to 40, particularly 0.5 to 15, mole % units derived from a non-conjugated diene or triene of the formula (I):

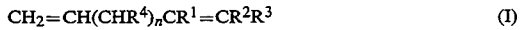

$$CH_2=CH(CHR^4)_nCR^1=CR^2R^3 \quad (I)$$

where
$R^1$ is a hydrogen atom or an alkyl group, particularly a $C_1$ to $C_{10}$ alkyl group;
$R^2$ is independently a group as defined for $R^1$ (above), provided that $R^1$ and $R^2$ are not both hydrogen atoms;
$R^3$ is an alkyl group, particularly a $C_1$ to $C_{10}$ alkyl group or is an alkenyl group of the formula (II):

$$-(CHR^8)_mCR^5=CR^6R^7 \quad (II)$$

where
$R^5$ and $R^6$ are independently groups as defined for $R^1$ (above), provided that $R^5$ and $R^6$ are not both hydrogen atoms;
$R^7$ is an alkyl group particularly a $C_1$ to $C_{10}$ alkyl group; each $R^8$ is independently a group as defined for $R^4$ (below); and
m is an integer from 1 to 5, in particular 2 or 3;
each $R^4$ is independently a hydrogen atom or an alkyl, particularly a lower alkyl and especially a methyl group; and n is an integer of from 2 to 5, in particular 2, 3 or 4;
and from 99.9 to 60, particularly 99.5 to 85, mole I units derived from propylene.

The invention includes a method of making a copolymer of the invention comprising polymerising the respective monomers in the presence of a highly stereospecific Ziegler-Natta olefin polymerisation catalyst.

The monomer of general formula (I) (the diene or triene monomer) includes an alpha-olefinic double bond which will polymerise under Ziegler-Natta conditions. The two carbon atoms of the second double bond of the diene or triene monomer have at least 3 substituent carbon atoms (including the main chain of the compound) bonded to them. This is necessary to avoid deactivating the highly stereospecific Ziegler-Natta catalysts where there are only one or two carbon based substituents. Of course, all four substituents can be carbon based. In terms of the general formula (I) this means that at least two of the groups $R^1$, $R^2$ and $R^3$ are alkyl groups (or for $R^3$ an alkenyl group of the formula II).

When $R^1$ and/or $R^2$ are alkyl groups it is particularly convenient if they are short chain alkyl, especially $C_1$ to $C_3$ and most conveniently methyl, groups. $R^3$ can also conveniently be such a short chain alkyl especially methyl group or it can be a longer chain straight or branched chain alkyl group. When $R^3$ is an alkenyl group, the double bond is not conjugated with the $-CR^1=R^2R^3$ double bond of the diene or triene monomer and, like the 'second' double bond it has at least 3 carbon based substituents. Of course, when $R^3$ is an alkenyl group the diene monomer is technically a non-conjugated triene, however, for clarity and brevity this possibility is encompassed by the general term 'diene or triene monomer'as applied to the monomer of the formula (I). Within $R^3$, when the groups $R^5$ and/or $R^6$ and/or $R^7$ are alkyl groups they are particularly short chain alkyl, especially $C_1$ to $C_3$ and most conveniently methyl, groups. The groups $R^4$ and $R^8$ (when $R^3$ is an alkenyl group) can all be hydrogen atoms. When at least some of them are alkyl groups it is desirable that such alkyl groups do not unduly crowd the main chain of the alkyl substituted diene or triene monomers. Accordingly, when there are two or more such alkyl substituents, they will generally be separated by at least one unsubstituted methylene group along the chain.

Specific diene or triene monomers include 7-methyl-1,6-octadiene, 3,7-dimethyl-1,6-octadiene, 5,7-dimethyl-1,6-octadiene, 3,7-dimethyl-1,6-octadiene, 3,7,11-trimethyl-1,6,10-octatriene and 6-methyl-1,5-heptadiene. The 1,6-octadienes and their chain extended derivatives are especially useful and the use of such materials forms a particular and desirable feature of this invention.

Olefin polymerisation using Ziegler-Natta catalysts generally does not involve long lived live polymer chains i.e. polymer chains carrying an active site for polymerisation. Polymerisation takes place at a metal complex catalytic site with monomer units being incorporated onto one end of a growing polymer chain. Although individual catalyst sites remain active throughout the polymerisation (unless deactivated or poisoned) individual polymer chains are synthesised and removed from the catalytic site rapidly, typically within a second or so. The use of chain transfer agents (usually hydrogen), which are used to control the molecular weight of the polymer product, enables the removal of polymer chains from the catalytic site in a balanced way. If polymerisation is terminated polymer chains growing at that time will, in the absence of sufficient chain transfer agent terminate by bonding to other species, commonly to the reducing co-catalyst, typically aluminium triethyl in propylene polymerisation. Copolymers are made by using a suitable mixture of monomers as the feedstock for the reaction. The (molar) proportion of each monomer incorporated into the polymer depends on the relative (molar) proportions of the monomers and the (molar) reactivity of the respective monomers in the polymerisation system. Generally, such copolymers are described as being 'random' copolymers. In practice, the ordering or units along the copolymer chain is often not truly random in a mathematical sense but is determined statistically by the detailed mechanism of polymerisation in which the effective reactivity of a particular monomer can vary depending on the nature of the previous monomer unit polymerised.

The copolymers of this invention can be made by methods similar to those used for making polypropylene homopolymer and copolymers in modern practice. The polymerisation can be carried out in a suitable diluent, usually a liquid paraffinic hydrocarbon, at or near atmospheric pressure or at superambient pressure, in the liquid phase at superambient pressure using liquid propylene as the reaction medium, or using gas phase technology in which the olefin monomer(s) (including propylene) are gaseous and the other reaction components are in condensed phases in a stirred bed or fluidised bed reactor. The catalyst systems used is a highly stereospecific Ziegler-Natta catalyst system. Usually, this will include a solid phase supported transition metal catalyst such as a titanium based catalyst supported on a magnesium containing, typically magnesium halide, catalyst support. The catalyst system includes, as a co-catalyst, a reducing agent, typically an aluminium alkyl or haloalkyl and most commonly alumnium triethyl. This is usually fed to the polymerisation reactor with the transition metal catalyst.

The supported catalyst can, and where the synthetic route used includes a stage in which propylene is homopolymerised almost invariably will, include a Lewis base as a so-called internal electron donor. This will typically be a polar oxygen containing organic compound, usually an ester. Dialkyl phthalate esters are particularly effective as internal electron donors. The catalyst systems can, and for making polypropylene homopolymer (as with the internal electron donor) almost invariably will, include a Lewis base as a so-called external electron donor. The external electron donor is typically fed to the polymerisation reactor with the other catalyst components. Silanes, especially dihydrocarbyl dihydrocarbyloxy silanes, especially di-(lower alkyl) dimethoxy silanes, are effective external electron donors. The function of the internal and external donors is to enhance the stereo-specificity of the (already highly stereospecific) catalyst system. The precise mechanism of their operation is not fully understood.

We use a highly stereospecific catalyst to synthesise a copolymer which is highly isotactic. This gives it enhanced strength and a melting temperature closer to that of isotactic polypropylene homopolymer than if a non-stereospecific catalyst were used. Of course, the presence of comonomer units derived from the diane or triene monomer, even if stereochemically isotactic, will tend to make the copolymer less crystalline than polypropylene homopolymer (of equivalent stereoregularity).

Within the broad ranges of composition set out above, the particular proportions of monomers chosen for a specific copolymer will be determined by the properties needed to fit it for its intended end use. To enable cross linking of thermoplastic polypropylene a typical binary copolymer of propylene and the diene or triene monomer would include from 0.1 to 10, especially 0.3 to 5, mole % units derived from the diene or triene monomer, the reminder being units derived from polypropylene. Generally, these levels of the diene or triene monomer are appropriate where the intent is to vulcanise the copolymer as such or for the copolymer to be a separate phase in a multiphase blend with (an)other polymer(s). However, the functionality of the copolymers of this invention can be used in blends, single or multiphase, in polymers lacking such functionality. In such blends, the copolymers of this invention enable cross-linking, or other appropriate functionalisation of the non-functional polymer. It is desirable to achieve at least about 0.2 and, more usually 0.5, mole % or greater total (or equivalent) content of units derived from the diene or triene monomer in such a blend. The upper limit is set by the relative proportions of polymers in the blend and the functionality of the copolymer of the invention, but will usually be not more than about 5 mole %. To achieve these proportions in a blend where the bulk of the polymeric material is not functionalised, the copolymer of the invention may need to have a higher concentration of unsaturation corresponding to up to 30, and in particular from 10 to 25, mole % units derived from the diene or triene monomer. The non-functional polymer used in such blends will most commonly be polypropylene. The copolymers of this invention can, but will not usually, include other monomers in minor amounts not exceeding 3%, more usually not more than 2%, by weight of the total copolymer. The other monomer(s) can be ethylene or a $C_4$ to $C_{12}$ alpha-olefin.

The copolymers of the present invention are particularly applicable to the manufacture of polypropylene based materials having, after cross-linking of the residual double bonds in the copolymer, enhanced performance at higher temperatures than corresponding materials not including the copolymer. The presence of the residues of the diene or triene in the copolymer also enables the copolymers to be reacted to give polymers having melt rheological properties significantly different from those of polypropylene homopolymer. In addition, we have found, most surprisingly, that the copolymers of this invention have reduced solubility in organic solvents such as xylene. Our observations to date indicate that the diene or triene containing copolymers themselves do not have higher isotacticity than corresponding homopolymers. From this we infer that the presence of the diene or triene is reducing the solubility of the atactic polymer in the product. Even though we do not fully understand how the property change is produced, the result is of value in end uses where the product polymer is in contact with oils or fats, in particular food contact applications such as packaging and foil or film applications.

The copolymers of the invention can be cross-linked by the techniques conventionally used to cross-link EPDM rubbers. The most common of these is vulcanisation by sulphur itself or by thio-compounds such as zinc dithiocarbazide with accelerators and modifiers as appropriate, or using 'vulcanizing' agents not based on sulphur e.g. those based on isocyanate functional groups. Cross-linking can also be effected by free radical mechanisms using, typically, peroxides or hydroperoxides as initiators.

The invention includes copolymers of the invention which have been vulcanised or otherwise cross-linked, blends containing such copolymers which are then cross-linked and products containing copolymers of the invention whether or not cross-linked or vulcanised.

The use of the copolymers of the invention is not restricted to purely polymer resin systems. The copolymers, or blends, or olefin block copolymers containing them can be compounded with fillers, including particular fillers such as clays, silica, calcium carbonate, talc and mica and fibrous fillers or re-inforcing agents such as continuous, short or long chopped fibre, glass fibre, carbon fibre, metallic or ceramic fibres and whiskers and organic fibres such as aramid fibres; colouring materials such as pigments, dyes and opacifying agents: and additives such as antioxidants, lubricating agents, mould release agent and processing aids. (Vulcanising and cross-linking agents are referred to above). Accordingly, the invention includes the copolymer of the invention, optionally blended with other polymers (or formed in olefin block copolymers) including fillers and/or colouring materials and/or further additives. The compounded polymer can include vulcanising and/or cross-linking agents and the invention includes the compounded product after moulding and/or after vulcanisation or cross-linking.

The following Examples illustrate the invention. All parts and percentages are by weight unless otherwise stated, except that nmr ppm values are (of course) numerical ratios. Examples SE1 to SE5 are Synthesis Examples illustrating the synthesis and properties of copolymers of the invention.

Materials Used

The Ziegler-Natta olefin polymerisation catalysts used are sensitive to both moisture and oxygen. To avoid deactivating the catalysts care is routinely taken to avoid contact with even small amounts of water (or other polar compounds such as alcohols) or oxygen. Accordingly, the materials and equipment used are dried and free from contact with moisture and oxygen so far as is practical.

EC180 is an aliphatic hydrocarbon diluent consisting essentially of dodecane isomers and having a boiling point in the range 170° to 180° C. It is used in the Examples from a stock stored under dry nitrogen sparging to keep it free from water and oxygen.

7-methyl-1,6-octadiene—is available from Shell Chemicals Limited and is used as the liquid monomer. (As supplied, this contains 100 ppm by weight of butyl catechol as a free radical inhibitor. In the gas phase polymerisations in Example SE7, the inhibitor is removed from the diane monomer prior to use by passing it through a column of anhydrous calcium sulphate; this also reduces the water content to about 7ppm.)

propylene is commercial purity dry monomer for polymerisation.

hydrogen and nitrogen are commercially available dry, oxygen free grades (stored under pressure in cylinders) and further dried in a drying column before use.

aluminium triethyl is commercial (olefin polymerisation) grade material used as a 1 molar solution in EC180.

silane is a commercially available di(lower alkyl) dimethoxy silane used as the neat liquid.

Catalyst A is a slurry of a conventional magnesium chloride supported titanium, high stereospecificity Ziegler-Natta olefin polymerisation catalyst made as follows. Solid magnesium chloride is treated with ethanol to give a haloethanolate (probably magnesium chloride with ethanol of crystallisation) which is dispersed in hot EC180 and spray quenched into cold EC180. The magnesium haloethanolate slurry is treated with $TiCl_4$ (about 6g per g of the magnesium halo ethanolate) and heated to 110–120° C. Di-isobutylphthalate is added as internal electron donor (about 14 g per g of the magnesium haloethanolate). The mixture is allowed to settle and the supernatant liquid is discarded. The treatment with $TiCl_4$ is repeated at ca. 110° C. and excess $TiCl_4$ is then removed by repeated dilution, settling and decanting. Before use in the Examples, the catalyst is prepolymerised (with propylene) using alumnium triethyl as co-catalyst and di(lower alkyl) dimethoxy silane as external electron donor at approximate molar ratios of Al:Ti:Si of 3:1:1. The prepolymerisation is stunned with $CO_2$ when about 3 g polypropylene per g catalyst has been made.

Catalyst B is a slurry in EC180 of a magnesium-titanium high stereospecificity Ziegler-Natta olefin polymerisation catalyst made generally as described in EP 0290149 A using magnesium diethoxide as the alkoxide. It is used in the Examples without being prepolymerised. As prepared Catalyst B slurry contains ca. 1400 m moles.$1^{-1}$ of titanium.

The Catalyst slurriss (and diluted slurriss) were analysed for titanium by shaking an aliquot (10ml) of slurry with 3 molar sulphuric acid (100 ml) separating the aqueous acid layer from the organic layer and measuring the titanium content of the aqueous layer by spectrophotometry. Titanium contents are given as millimoles of titanium per liter of slurry.

Test Methods

Chemical properties of (co)polymers

Catalyst residues—the Mg content of the polymer was measuring using neutron activation analysis on polymer powder samples. Results are given in parts per million (ppm) by weight on the total polymer product.

Diane or triene content (DC)—the proportion of residues in the copolymer derived from the diane or triene monomer was calculated from $^1H$ nmr analysis of the copolymer (in solution). The integration of —CH=C< protons as a proportion of that of other aliphatic protons, together with knowledge of the structure of the monomers (in particular the number of hydrogen atoms they contain) permits the calculation of the proportion of diane or triene monomer derived units in the copolymer (for binary polymers). Results are given as mole %.

Polymer stereoregularity—was assessed by nmr and solubility methods.

Nmr—two methods both on the solid phase (powder) were used:

Newport—is a measure of the wide line $^1H$ nmr absorption of the (co)polymers. We used an Oxford Instruments Newport analyser model NA3 operating at 20 MHz and 5 kGauss (0.5T). The analyser is operated to measure the wide line signal strengths of the solid phase aliphatic 1H nmr signal at two bandwidths; a relatively narrow line width of 0.5 gauss ($5 \times 10^{-5}T$; equivalent line width=100 ppm) and a relatively broad line width of 10 Gauss ($1 \times 10^{-3}T$; equivalent line width 2000 ppm). (These signal strengths correspond to peak integration in high resolution nmr.) The analyser automatically divides the measured signal strength by the line width measured and the value quoted is the ratio (broad line width signal strength) / (narrow line width signal strength). [Making the division by line width explicit the ratio is: 0.5×(measured broad line width signal strength) / 10×(measured narrow line width signal strength).] This measurement is based on the understanding that stereoregular chains will tend to be crystalline and thus have restricted movement whilst non-stereoregular chains tend to be amorphous and have less restricted movement. Protons on chains with relatively free movement tend to 'see' an averaged relatively uniform electronic environment and thus give a relatively narrow absorption signal. Individual protons on chains in crystalline regions will 'see' a relatively fixed electronic environment but this will differ from proton to proton thus giving an overall broad absorption signal. The values of the two line widths are chosen to resolve these peaks reasonably precisely. As the method depends critically on the freedom of movement of protons (or rather of the carbon atoms carrying them) the measurement is sensitive to temperature. We carry out measurements on samples carefully equilibrated at 50° C. The measurement is also sensitive to the presence of residual monomers and care is taken to remove these from the polymer powder as far as is practical. The result is a numerical ratio, the higher the more stereoregular the sample, which we refer to herein as the Line Width Ratio (LWR). For most polymers measurements were made within a day or so of the synthesis and are labelled "fresh" measurements. For some polymers the measurement was repeated about 10 days later and are labelled "aged" measurements. This shows up any annealing of the (co)polymer in the interval which usually leads to higher values of the ratio i.e. higher crystallinity (or higher perceived stereoregularity).

Brüker—uses a Brüker Minispec nmr analyser. This method measures the intensity of the free induction decay of the nmr signal at two times, the first a "fast" figure representing the more mobile protons and a "slow" figure representing the less mobile protons. The quoted result is the ratio of these two figures with higher ratios indicating lower stereoregularity. These results are labelled "Brüker".

Xylene Solubles (Xys)—is the percentage (by weight) of the polymer which is soluble in xylene using FDA (US Food and Drug Administration) method 177.1520. It involves dissolving a 2 g sample of copolymer in 100 ml of hot (boiling) xylene, cooling the solution to 25° C., separating the precipitated material from the remaining solution and measuring the material in solution by evaporation of solvent and weighing. The mixture is usually held at 25° C. for at least 12 hours to ensure equilibration of solution and precipitate. The amount dissolved is calculated and expressed as a percentage of the starting quantity of polymer. Generally for polypropylene polymers, the lower the solubility, the more crystalline (isotactic) is the polymer.

Physical Properties of (co)polymers

Flexural modulus (FM)—was measured by the method of ISO 178 on compression moulded flexural test samples. Results are given in GPa.

Melt Flow Index (MFI)—This was measured by ASTM Test Method D1238/70, using a temperature of 190° C. and a weight of 10 kg (to give a force of ca.98 N). Results are quoted in reciprocal seconds ($s^{-1}$)

Equipment Used 1 liter glass reactor

Examples of polymerisations run at ambient pressure in EC180 as a diluent were carried out in a glass reactor (Examples SE1, SE2 and SE4).

The reactor is an air tight spherical 1 liter glass vessel having a water filled jacket to maintain the vessel contents at the desired reaction temperature (50° C. in these Examples). It is fitted with a mechanical stirrer, a valved inlet line for diluent (EC180), a gas feed line, a port closed by a rubber saprum and a valved outlet part. The gas supply line includes a mercury manometer and can be switched to nitrogen, vacuum or propylene monomer. From startup, the reactor is prepared for use by injecting (through the saprum) aluminium triethyl solution, adding further EC180 and stirring vigorously to consume any moisture present. The wash is discarded and the vessel purged thoroughly with nitrogen, using the vacuum line to enhance removal of the gas in the reactor. The required amount of diluent is added and the reactor is purged with the propylene monomer. This can be done directly from the supply or through a feed on demand valve used to monitor consumption of the gas during the reaction. Before starting the polymerisation reaction the diluent is saturated with the propylene monomer at ambient pressure. The reaction mix is stirred throughout the reaction.

The feed on demand valve operates to balance the consumption of olefin monomer and the supply to the reactor. During polymerisation the atmosphere in the reactor is (apart from diluent vapour) of the olefin monomer. As the polymerisation proceeds this monomer is consumed thus reducing the pressure in the reactor. The manometer is sensitive to the pressure difference between the reactor and ambient atmospheric pressure and has an adjustable set of contacts controlling a valve which feeds an approximately fixed amount of olefin monomer (ca. 0.13 g for propylene), thus maintaining a (near) ambient pressure in the reactor. The rate at which the valve is actuated, the 'count rate' (in fact, the number of counts per four minutes) is a rough measure of the rate of consumption of the olefin monomer and, thus, of the polymerisation reaction. The contacts are adjustable to compensate for the vapour pressure of the diluent, if desired. At the end of the polymerisation, the product can be removed through the outlet without allowing moisture of oxygen to enter the reactor thus facilitating subsequent runs.

3 liter autoclave

Examples of polymerisations run in liquid polypropylene, so-called bulk or liquid phase polymerisations, were carried out in an autoclave reactor (Example SE5 Runs A, B, and C).

This reactor is a nominal 3 liter stainless steel experimental autoclave having a water jacket supplied with water at a temperature controlled to keep the contents of the autoclave at 50° C. (in these Examples). The autoclave is fitted with a mechanical stirrer, temperature and pressure sensors, vacuum, nitrogen and hydrogen gas and propylene liquid, supply lines and a valved port to enable the addition of other reaction components. The hydrogen line is controlled by an automatic mass rate feed. In operation the autoclave is thoroughly dried, sealed and purged with nitrogen. The diene or triene monomer, silane (when used) aluminium triethyl solution and catalyst slurry are introduced through the port and the valve closed. The stirrer is started and then ca. 3 liters liquid propylene is added and the propylene line closed. Gaseous hydrogen is supplied to the reactor as desired at a pre-determined rate. At the end of the polymerisation, excess propylene is vented from the autoclave to reduce the pressure to ambient and the autoclave is unsealed to enable recovery of the solid polymer.

Pilot scale autoclave reactor

Examples of polymerisations run in EC 180 diluent and in liquid polypropylene, so-called bulk or liquid phase polymerisations, were carried out in a pilot scale autoclave reactor (Examples SE5 and SE6).

This reactor is a nominal 5 liter stainless steel pilot scale autoclave having a heating jacket operated to control the temperature of the contents of the autoclave. The reactor is fitted with a mechanical stirrer, temperature and pressure sensors, vacuum, nitrogen and hydrogen gas and propylene (gas or liquid respectively), supply lines and a valved port to enable the addition of other reaction components. In operation the autoclave is thoroughly dried, sealed and purged with nitrogen. The hydrocarbon diluent (when used), diene or triene monomer, prepolymerised catalyst (Catalyst A) aluminium triethyl co-catalyst (10 ml) and silane (2 ml) are introduced through the port and the valve closed. The stirrer is started and propylene is added and the propylene line closed. Gaseous hydrogen is supplied to the reactor to give a pre-determined hydrogen partial pressure at the start of polymerisation. At the end of the polymerisation, the reactor is vented to reduce the pressure to ambient and the autoclave is unsealed to recover the polymer.

Pilot scale gas phase reactor

Examples of polymerisations run in a stirred bed reactor with the propylene in the gas phase, so-called gas phase polymerisations, were carried out in a pilot scale (Example SE7).

This reactor is a nominal 50 liter stainless steel pilot scale reactor fitted with a mechanical stirrer, temperature and pressure sensors, nitrogen and hydrogen gas and propylene liquid, supply lines, a pumped line to supply the liquid diene or triene a product removal line and a cooling loop. The hydrogen line is valve controlled. The reaction temperature is controlled by recycling a portion of the propylene gas through the cooling loop to condense it and returning the liquid to the reactor (where it flashes into the gas phase thus cooling the reaction). In operation the reactor is started up liquid propylene having dispersed in it prepolymerised catalyst (Catalyst A) aluminium triethyl co-catalyst and silane and diene or triene monomer (using the pumped line) are introduced into the reactor at controlled rates. The pressure and temperature in the reactor are controlled so that the bulk of the propylene is in the gas phase near the dew point and the stirrer operated to keep the reactor contents well stirred but not fluidised. Gaseous hydrogen as a chain transfer is supplied as needed to the reactor to control the molecular weight of the polymer produced using a target MFI of 40. Under continuous operating conditions polymer is removed from the reactor, separated from the propylene monomer entrained in it and recovered. Subsequently the polymer has residual monomer flushed from it in a fluid bed drier.

EXAMPLE SE1

This Example illustrates the copolymerisation of propylene and a diene monomer (7-methyl-1,6-octadiene) according to the invention.

The 1 liter glass reactor was prepared as described above and propylene polymerisation was started by injecting first 10 ml aluminium triethyl solution and then 5 ml Catalyst A slurry into the stirred diluent in the reactor. After about 40 minutes a further 10 ml aluminium tiethyl solution and 5 ml of Catalyst A slurry were injected into reaction mix to counter (in part) the expected diminution of reaction rate on addition of the diene. After a further 20 minutes, 50 ml of 7-methyl-1,6-octadiene were injected into the reaction mix. As expected, the count rate fell to about a half of its previous rate on addition of the diene. The polymerisation was continued for a further 3 hours; in the first two hours the count rate remained approximately constant but in the third hour fell to about two thirds of its previous rate. The reaction was also monitored by gas liquid chromatography (glc) on samples of the mix, to follow the concentration of the diene monomer in the diluent. This indicated that the diene monomer was being consumed fairly steadily during the reaction.

At the end of the polymerisation the propylene gas supply was turned off, the nitrogen supply was turned on and the reaction mixture removed through the outlet port. The mix was allowed to settle and excess diluent was decanted from the solid polymer which was then washed with acetone (ca. 250 ml): HCl (ca. 20 ml of 1 molar aqueous solution) to destroy any remaining aluminium triethyl and to wash out residual diene monomer. The mix was allowed to settle, the excess liquid decanted and the polymer was washed twice further with acetone (250 ml) in a similar fashion and then the solid polymer was dried in a vacuum oven at 90° C. for two hours (to remove acetone and unreacted propylene dissolved in the polymer).

The results of analysing and testing this copolymer product are set out in Table 1 below. The 1H nmr spectrum used to measure the proportion of diene residues in the copolymer also showed that the product included no (detectable) alpha-olefinic protons. This indicates the the copolymer was recovered substantially free of residual diene monomer and that the diene co-polymerised exclusively through the alpha-olefinic double bond.

EXAMPLE SE2

This Example illustrates the production of a propylene-diene monomer copolymer having a very high proportion of units derived from a diene monomer.

A 250 ml 3 necked flask was equipped with a mechanical stirrer, a port closed by a rubber septum and a gas supply line providing switchable nitrogen, vacuum and propylene (not through a feed on demand valve) supply and an exhaust line. The flask was dried thoroughly using an aluminium triethyl wash and purged with nitrogen. 50 ml of 7-methyl-1,6-octadiene and 10 ml aluminium triethyl solution were injected into the flask and propylene was bubbled through the stirred liquid reaction mix. Polymerisation was started by injecting 5 ml of Catalyst A slurry into the mix. The polymerisation was continued at ambient temperature for about 2½ hours. The product was a thick viscous brown liquid which became very sticky on cooling. Analysis of an acetone extract of a sample of the product by glc indicated that the product included some unreacted diene monomer.

Samples of the copolymer were purified for analysis by dissolving them in EC180 and precipitating the copolymer with acetone. The solid copolymer was subsequently washed with acetone and dried. The results of analysis of this product are included in Table 1 below.

EXAMPLE SE3

This Example illustrates the use and effect of including silane as an external electron donor in the copolymerisation reaction.

The 1 liter glass reactor vessel was set up as described in Example SE1 containing 500 ml of EC180 saturated with propylene. Polymerisation was started by injecting 40 ml aluminium triethyl solution and then 5 ml of a diluted slurry of Catalyst B in EC180 containing 0.04 mmol. (100 ml)$^{-1}$ of titanium into the reaction mix. After about 15 minutes 50 ml of 7-methyl-1,6-octadiene were injected into the reaction mixture. The polymerisation was continued for about an hour before recovering the products.

Four runs of this Example were carried out with the following variations:

Run A: as described above i.e. with no silane included in the reaction mix. On addition of the diene monomer it was noted that the rate of consumption of propylene fell to about half the rate immediately before addition of the diene monomer.

Run B: was a repeat of Run A but 0.5 ml silane was injected into the reaction mix prior to the catalyst. The overall rate of consumption of propylene was about half that in Run A with a similar proportionate rate reduction on addition of the diane monomer.

Run C: was a repeat of Run B using 13 ml of silane. This is in excess of the amount having any practical effect on the reaction stereochemistry. The initial rate of propylene consumption was slightly higher than in Run B but on addition of the diane monomer the rate fell to about the same as at the corresponding stage in Run B.

Run D: was a comparative run, duplicating Run B but not adding any diane monomer, so as to make polypropylene homopolymer. The products of the four runs were worked up as described in Example SE1 and the products of runs A, B and C were combined for subsequent analysis and testing. The results are set out in Table 1 below.

EXAMPLE SE4

This Example illustrates the production of propylene-diene monomer copolymers using a so-called 'bulk' polymerisation technique. In this the reaction medium is liquid propylene and polymerisation takes place under superambient pressures, typically about 20 atmospheres (ca. 2 MPa) gauge, generated by the vapour pressure of propylene at the reaction temperature.

The 3 liter autoclave was set up as described above and three runs were carried out using the materials and with the variations set out below.

| Run | A | B | C |
|---|---|---|---|
| liquid propylene volume (l) | 3 | 2.8 | 2.7 |
| hydrogen supply (mol.hr$^{-1}$) | 0.2 | 0.2 | 0.2 |
| aluminium triethyl solution (ml) | 40 | 40 | 20 |
| silane (ml) | 0.5 | 0.5 | 0.5 |
| diene monomer (ml) | 0 | 100 | 200 |
| Catalyst B slurry (ml) | 2 | 2 | 1 |

Notes
Run A was a comparison run to make polypropylene homopolymer. At the start of Run A the hydrogen supply did not work properly so that less hydrogen (possibly none for about 10 minutes) was supplied in the early stages of the polymerisation. This probably lead to the synthesis of some higher molecular weight material. (This is consistent with the low value for MFI for the polymer from this run.)
Runs B and C were to make propylene-diene monomer copolymers under slightly different conditions.
In Runs B and C the diene used was 7-methyl-1,6-octadiene.
The Catalyst B slurry used in all three runs contained 48 mmol.l$^{-1}$ of titanium.

The solid product recovered from each run was removed from the autoclave and dried for 1 hour in a fluid bed drier at 90° C. to remove dissolved propylene. The products of runs B and C had a finer particle size than that of the homopolymer of run A. Additionally, the copolymers had a greater tendency to lightly fuse together or onto the walls of the autoclave, but that fused lumps were readily broken down. The results of analysis and testing of these polymers are included in Table 1 below.

EXAMPLE SE5

This Example illustrates the production of propylene-diene monomer copolymers using a diluent polymerisation technique using the pilot scale autoclave reactor as described generally above.

Various runs were carried out using the conditions set out in Table 2a and the properties of the polymers obtained are set out in Table 2b below.

EXAMPLE SE6

This Example illustrates the production of propylene-diene monomer copolymers using a liquid phase or so-called 'bulk' polymerisation technique using the pilot scale autoclave reactor as described generally above.

Various runs were carried out using the conditions set out in Table 3a and the properties of the polymers obtained are set out in Table 3b below.

EXAMPLE SE7

This Example illustrates the production of propylene-diene monomer copolymers using a gas phase polymerisation technique using the pilot scale gas phase reactor as described generally above.

Various runs were carried out using the conditions set out in Table 4a and the properties of the polymers obtained are set out in Table 4b below. These polymers exhibit lower Xylene solubility as the proportion of the diene incorporated into the copolymer increases.

TABLE 1

| Ex No. | DC (mol %) | LWR fresh | LWR aged | FM (GPa) | MFI (sec$^{-1}$) |
|---|---|---|---|---|---|
| SE1 | 6.7 | | | | |
| SE2 | 40 | | | | |
| SE3 (A to C) | 6.0 | | | | |
| SE3 (D) | 0 | | | | |
| SE4 (A) | 0 | 1.63 | 2.55 | 1.5 | 1.9 |
| SE4 (B) | 0.3 | 1.19 | 1.52 | 1.53 | 12.8 |
| SE4 (C) | 0.7 | 1.11 | 0.97 | 1.14 | 4.4 |

TABLE 2a (Ex SE5)

| Run No | Temp (°C.) | Press (bar g) | EC 180 (ml) | H$_2$ (kPa) | diene (ml) |
|---|---|---|---|---|---|
| C1 | 60 | 7 | 4000 | 690 | 0 |
| C2 | 60 | 7 | 4000 | 415 | 0 |
| 1 | 60 | 7 | 2000 | 415 | 1600 |
| 2 | 60 | 7.5 | 2000 | 415 | 2000 |
| 3 | 60 | 4.8 | 2000 | 415 | 2000 |
| 4 | 50 | 5 | 2000 | 415 | 2000 |
| 5 | 60 | 6.6 | 3000 | 415 | 1000 |

TABLE 2b (Ex SE5)

| Run No | DC (mol %) | stereoregularity Brüker | stereoregularity Xys (%) | FM (GPa) | MFI (sec$^{-1}$) |
|---|---|---|---|---|---|
| C1 | 0 | — | — | — | 88 |
| C2 | 0 | — | — | — | 63 |
| 1 | 2 | — | — | — | 7.5 |
| 2 | 1.9 | 11.3 | 4.7 | — | 13 |
| 3 | 3.25 | — | — | — | 0.5 |
| 4 | 1.9 | 19.6 | 10.6 | 0.72 | — |

TABLE 2b-continued

| | | (Ex SE5) | | | |
|---|---|---|---|---|---|
| Run No | DC (mol %) | stereoregularity Brüker | Xys (%) | FM (GPa) | MFI (sec$^{-1}$) |
| 5 | 2 | 13.3 | 2.9 | — | 38.4 |

TABLE 3a

| | (Ex SE6) | | |
|---|---|---|---|
| Run No | Temp (°C.) | H$_2$ (MPa) | diene (ml) |
| 1 | 70 | 2.8 | 1000 |
| 2 | 70 | 3.1 | 1500 |
| 3 | 70 | 3.1 | 500 |
| 4 | 70 | 3.1 | 1000 |
| 5 | 70 | 5.5 | 1500 |

TABLE 3b

| | | (Ex SE6) | | | |
|---|---|---|---|---|---|
| Run No | DC (mol %) | stereoregularity Brüker | Xys (%) | FM (GPa) | MFI (sec$^{-1}$) | Mg (ppm) |
| 1 | 0.55 | 15.3 | 2.2 | 1.27 | 68.5 | 11.8 |
| 2 | 1.6 | 19.2 | 1.9 | 1.07 | 100 | 11 |
| 3 | 0.6 | — | — | — | 44 | — |
| 4 | 1.1 | — | — | — | 50 | — |
| 5 | 1.4 | 19.9 | 2.5 | 1.08 | 91 | 9.9 |

TABLE 4

| | | | (Ex SE7) | | | |
|---|---|---|---|---|---|---|
| Run No | diene (ml. hr$^{-1}$) | DC (mol %) | stereoregularity Brüker | Xys (%) | FM (GPa) | Mg (ppm) |
| C1 | 0 | 0 | 13.6 | 2.4 | 1.57 | 8.6 |
| 1 | 360 | 0.2 | 15.6 | 2.0 | 1.50 | 11 |
| 2 | 200 | 0.15 | 14.9 | 2.1 | 1.54 | 10.3 |

I claim:

1. A random co-polymer of: from 0.1 to 40 mole % units derived from a non-conjugated diene or triene of formula (I):

$$CH_2=CH(CHR^4)_nCR^1=CR^2R^3 \quad (I)$$

where

R$^1$ is a hydrogen atom or an alkyl group;

R$^2$ is independently a hydrogen atom or an alkyl group, provided that R$^1$ and R$^2$ are not both hydrogen atoms;

R$^3$ is an alkyl group or an alkenyl group of the formula (II):

$$-(CHR^8)_mCR^5=CR^6R^7 \quad (II)$$

where

R$^5$ and R$^6$ are each independently a hydrogen atom or an alkyl group, provided that R$^5$ and R$^6$ are not both hydrogen atoms;

R$^7$ is an alkyl group;

each R$^8$ is independently a hydrogen atom or an alkyl group; and m is an integer from 1 to 5;

each R$^4$ is independently a hydrogen atom or an alkyl group; and n is an integer of from 2 to 5; and from 99.9 to 60 mole % units derived from propylene.

2. A copolymer as claimed in claim 1 wherein alkyl groups defined for R$^1$, R$^2$, R$^3$, R$^5$, R$^6$ and R$^7$ are are C$_1$ to C$_{10}$ alkyl groups; alkyl groups defined for R$^4$ and R$^8$ are methyl groups; m is 2 or 3; and n is 2, 3 or 4.

3. A copolymer as claimed in claim 2 wherein alkyl groups defined for R$^1$, R$^2$, R$^3$, R$^5$, R$^6$ and R$^7$ are C$_1$ to C$_3$ alkyl groups.

4. A copolymer as claimed in claim 1 wherein the diene or triene monomers is one or more of 7-methyl-1,6-octadiene, 3,7-dimethyl- 1,6-octadiene, 5,7-dimethyl-1,6-octadiene, 3,7-dimethyl-1,6-octadiene, 3,7,11-trimethyl-1,6,10-octatriene and 6-methyl-1,5-heptadiene.

5. A copolymer as claimed in any one of claims 1 to 4 containing from 0.5 to 15 mole % units derived from a non-conjugated diene or triene of the formula (I) and from 99.5 to 85 mole % units derived from propylene.

6. A polymeric composition comprising a propylene copolymer as claimed in claim 1 which has been cross-linked, vulcanised or cured.

7. A polymeric composition as claimed in claim 6 or comprising a propylene copolymer as claimed in claim 1 which further contains one or more of particulate fillers, re-inforcing agents; colouring materials; antioxidants; lubricating agents; mould release agents and processing aids.

* * * * *